United States Patent [19]

Mickelson

[11] 4,113,605

[45] Sep. 12, 1978

[54] CATALYTIC HYDROFINING PROCESS

[75] Inventor: Grant A. Mickelson, Yorba Linda, Calif.

[73] Assignee: Union Oil Company of California, Los Angeles, Calif.

[21] Appl. No.: 846,419

[22] Filed: Oct. 28, 1977

Related U.S. Application Data

[63] Continuation-in-part of Ser. No. 776,762, Mar. 11, 1977, Pat. No. 4,094,820.

[51] Int. Cl.$^2$ .................. B01J 23/88; B01J 23/28; C10G 13/06
[52] U.S. Cl. .................. 208/216; 208/254 H; 252/439; 252/448; 252/465; 252/477 R
[58] Field of Search ........................................ 208/216

[56] References Cited

U.S. PATENT DOCUMENTS

| | | | |
|---|---|---|---|
| 2,393,288 | 1/1946 | Byrns | 208/112 X |
| 2,913,422 | 11/1959 | Reitmeier | 252/465 |
| 3,132,111 | 5/1964 | Erickson et al. | 252/464 |
| 3,661,805 | 5/1972 | Horvath | 252/465 |
| 3,980,552 | 9/1976 | Mickelson | 208/216 |

Primary Examiner—Delbert E. Gantz
Assistant Examiner—G. E. Schmitkons
Attorney, Agent, or Firm—Lannas S. Henderson; Richard C. Hartman; Dean Sandford

[57] ABSTRACT

Carbonates and/or hydroxides of one or more of the Group VIII metals, cobalt and nickel, are reacted with molybdic acid in aqueous suspension to form a slurry of crystalline cobalt and/or nickel molybdate, which slurry is then reacted with gelatinous boehmite alumina, then extruded, dried and calcined. The method eliminates the use of ammoniacal solutions, washing and/or heating steps to remove undesired anions or cations, and requires but a single drying and calcination. The resulting catalysts are found to be very active for the desulfurization and denitrogenation of mineral oils.

10 Claims, No Drawings

CATALYTIC HYDROFINING PROCESS

RELATED APPLICATIONS

This application is a continuation-in-part of Ser. No. 776,762, filed Mar. 11, 1977 now U.S. Pat. No. 4,094,820.

BACKGROUND AND SUMMARY OF INVENTION

The prior art is replete with methods for the manufacture of alumina-based catalysts comprising molybdenum and one or both of the Group VIII metals, cobalt and nickel. Such methods involve a great number of combinations of various impregnation, coprecipitation, comulling techniques and the like. In many of these procedures, the molybdenum component is introduced in the form of solid ammonium heptamolybdate, or ammoniacal solutions thereof. Ammoniacal impregnating solutions often also comprise ammonia complexes of salts of the Group VIII metal component, the nitrates usually being preferred. The presence of ammonia or ammonium salts in any of these procedures leads to expensive requirements for the containing of ammonia vapors, and for ultimately removing ammonium ions from the catalyst. The latter is usually effected by washing procedures, leading to aqueous waste disposal problems, or by calcination which generates air pollutants such as nitrogen oxides through combustion of some of the ammonium ions. Nitrogen oxides are also generated in the thermal decomposition of nitrate ions associated with the Group VIII metal component. The various washing procedures and/or multiple impregnation steps often lead to the necessity for multiple drying and/or calcination steps. Any of these undesirable consequences substantially increase catalsyt manufacturing costs.

One very simple procedure which has been employed in the art, and which avoids the foregoing problems, involves mulling together powdered $MoO_3$ with powdered alumina and an oxide form of the Group VIII metal component. Such mixtures may be mulled either in the wet or dry state and subsequently formed into extrudates or pellets, and calcined. This procedure however does not provide an optimum combination, either physically or chemically, of all the catalyst components. It is generally believed that the preparation method should provide maximum interaction between the alumina and the molybdenum component, which comulling of the oxides in powdered form does not provide. Also, this method inherently results in very low surface areas of the active metal components. As a result catalysts prepared by the simple comulling of the oxide components always display very low activities.

I have now discovered a relatively simple preparation technique which substantially avoids the disadvantages, while retaining the principal advantages of the foregoing methods. This new procedure involves the following basic steps:

(1) reacting in an aqueous slurry at least one carbonate or hydroxide of nickel or cobalt with at least a stoichiometric proportion of $MoO_3$ and/or molybdic acid to form finely divided crystalline cobalt and/or nickel molybdate in aqueous suspension;

(2) mixing the aqueous suspension with sufficient alumina hydrate consisting essentially of gelatinous boehmite to provide the desired proportion of $Al_2O_3$ in the finished catalyst (3) digesting and/or mulling the resulting mixture for at least about 0.5 hour with at least sufficient water to provide an extrudable plastic mixture;

(4) recovering from step (3) an extrudable plastic mixture;

(5) extruding the plastic mixture to provide extrudates of desired size and shape; and (6) drying and calcining the extrudates.

It will be seen that the foregoing procedure requires no washing steps and but a single calcination step, does not employ ammonia, ammonium salts or nitrate salts, and generates no air or water pollutants. At the same time, in steps (3), (4), (5) and (6), an intimate interaction occurs between the boehmite alumina and the molybdate component, such that no cobalt and/or nickel molybdate is detectable by X-ray diffraction in the final catalyst. The activity of the resulting catalysts for desulfurization and denitrogenation is in most cases equal or superior to prior art catalysts of the same metals content prepared by conventional impregnation or coprecipitation methods.

PRIOR ART

U.S. Pat. No. 2,393,288 discloses a process wherein cobalt molybdate is said to be precipitated in an aqueous slurry of alumina gel. However, the process employs excess ammonium hydroxide, and the precipitated catalyst is said to have a pinkish color. Cobalt molybdate is bright purple in color and does not ordinarily precipitate from ammoniacal solutions. Subsequent investigations have shown that the patentee's pink precipitate was essentially a hydrated form of cobalt oxide.

U.S. Pat. No. 2,913,422 discloses a process wherein preformed solid cobalt molybdate is composited with powdered molybdenum trioxide and an alumina trihydrate and the mixture is pelleted and calcined. The resulting catalyst at this stage is relatively inactive, and is said to display satisfactory activity only after a subsequent treatment with aqueous ammonia solution followed by a second calcination. The gelatinous boehmite alumina employed herein combines readily with the cobalt molybdate, and no activation with ammonia is required.

DETAILED DESCRIPTION

The catalysts of this invention are designed to fall within the following composition ranges:

| Component | Catalyst Composition, Wt. % | |
|---|---|---|
| | Broad Range | Preferred Range |
| CoO and/or NiO | 2 - 20 | 3 - 10 |
| $MoO_3$ | 5 - 35 | 8 - 25 |
| $SiO_2$ | 0 - 10 | 1 - 4 |
| $Al_2O_3$ | Balance | |
| Wt. Ratio (CoO + NiO)/$MoO_3$ | 0.1 - 1 | 0.12 - 0.5 |

In the succeeding process description, it will be understood that the proportions of the varius raw materials utilized will be selected so as to provide finished catalysts falling within the above composition ranges. The silica component, which is often desirable as a stabilizer and/or activator, may be added as silica hydrogel or hydrosol at any desired point in the process. The succeeding description will be confined to preparation of cobalt-molybdenum type catalysts, but it will be understood that corresponding nickel components can be substituted in whole or in part for any of the described cobalt components.

In the first step of the process, the basic reaction which occurs with $CoCO_3$ is as follows:

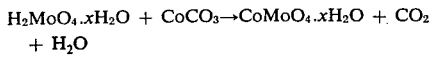

$H_2MoO_4 \cdot xH_2O + CoCO_3 \rightarrow CoMoO_4 \cdot xH_2O + CO_2 + H_2O$

The molybdic acid component is ordinarily added to the aqueous component as $MoO_3$, which becomes soluble as molybdic acid to the extent of about 2 wt.% at temperatures above 70° C. In the preferred procedure, $MoO_3$ is first slurried in the desired amount of water, and the temperature is raised to about 70° to 100° C., after which the cobalt carbonate is added slowly over a period of several minutes in order to avoid excessive foaming from the generated $CO_2$. Alternatively, the cobalt may be added to the slurry as the oxide or hydroxide, in either case the effective reactant being $Co(OH)_2$:

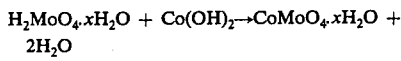

$H_2MoO_4 \cdot xH_2O + Co(OH)_2 \rightarrow CoMoO_4 \cdot xH_2O + 2H_2O$

The amount of water employed in this step is not critical, but for reasons of economy should not substantially exceed an amount which, together with any subsequent additions of water required in the process, will give an extrudable mixture at step (3). After completion of the addition of the cobalt component, it is generally desirable to continue stirring and heating the mixture at 90–100° C. for an additional 0.5–3 hours. During this period, a purple precipitate of well crystallized cobalt molybdate forms. Any stoichiometric excess of $MoO_3$ remains as such or dissolved in the aqueous phase as molybdic acid.

In the second step of the process, the molybdate slurry, either hot or after cooling, is admixed with sufficient alumina hydrate consisting essentially of gelatinous boehmite alumina to provide about 50–90, preferably about 65–85 wt.% of $Al_2O_3$ in the finished catalyst. The term "gelatinous" boehmite refers to the monohydrate AlO-OH in the form of small crystallites of average size ranging between about 30 and 200 angstroms. This material is sometimes referred to in the art as "pseudo" boehmite, which is actually a misnomer because the material does display the X-ray diffraction pattern of boehmite, although with considerable line broadening due to the range of crystallite sizes. Such material can exist in the form of a xerogel containing as little as about 20 wt.% $H_2O$, the stoichiometric $H_2O$ content of pure boehmite being about 15.6 wt.%. "Gelatinous" boehmite can also be defined as boehmite which on calcination at 900° F. yields an alumina having a surface area of at least about 200 m²/g.

The boehmite may be added to the molybdate slurry as a freshly precipitated, washed hydrogel, or in the form of a spray-dried xerogel. In either case a gelatinous mass or slurry is formed upon homogenization, as by mulling or stirring. The homogenized mixture should be digested and/or mulled, preferably at temperatures between about 50° and 100° C., for a sufficient time to give substantially complete reaction between the boehmite and the molybdate. This usually requires about 0.5–10 hours, depending on temperature. The water content of the mixture should be at least sufficient to provide an extrudable plastic mass; if excess water is present, as in a slurry, such excess may be removed during the digestion period by evaporation at e.g. 90°–100° C.

The resulting plastic mixture is then extruded under conventional conditions, at pressures of e.g. 100 to 10,000 psi, to provide extrudates ranging in diameter between about 1/32 and ¼ inch. The holes in the extrusion die may be circular in shape to provide cylindrical extrudates, or they may be polylobal in shape so as to provide extrudates having polylobal crosssections such as those disclosed in U.S. Pat. No. 3,966,644.

Drying of the extrudates at temperatures of about 200°–400° F. for about 1–12 hours in flowing air is generally desirable prior to calcination. Calcination is then carried out under conventional conditions in air at temperatures of about 800°–1500° F. for about 1–10 hours. Due to the fact that no extraneous anions or cations remain in the extruded catalyst, no noxious gases are generated during the drying and calcining steps.

Following the drying step, X-ray analysis of the product showed no detectable $CoMoO_4$, which leads to the conclusion that during the digestion, extrusion and drying steps, the $CoMoO_4$ must have reacted with a portion of the boehmite. This reaction is believed to be as follows:

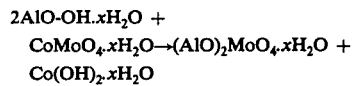

$2AlO\text{-}OH \cdot xH_2O + CoMoO_4 \cdot xH_2O \rightarrow (AlO)_2MoO_4 \cdot xH_2O + Co(OH)_2 \cdot xH_2O$ The alumina trihydrates, e.g. bayerite and gibbsite, do not react with $CoMoO_4 \cdot xH_2O$ in this manner to any great extent, and it is accordingly preferred that the alumina hydrate be at least about 80% boehmite. Upon calcination and sulfiding, it is believed that the compound $(AlO)_2MoO_4 \cdot xH_2O$ yields the most highly active form of molybdenum.

Catalysts prepared as described above are highly useful for the hydrodesulfurization and hydrodenitrogenation of substantially any hydrocarbonaceous mineral oil derived from petroleum, shale, tar sands, coal and the like. Such oils include crude oils, atmospheric and vacuum residual oils, gas oils, turbine fuels, diesel fuels, kerosene, naphthas, etc. Conventional hydrofining conditions are utilized, falling within the following general ranges:

| | Hydrofining Conditions | |
|---|---|---|
| | Broad Range | Preferred Range |
| Temp. ° F | 500 – 900 | 600 – 800 |
| $H_2$ Pressure, psig | 500 – 5000 | 1000 – 2500 |
| LHSV | 0.1 – 8 | 0.5 – 3 |
| $H_2$/oil, SCF/B | 500 – 10,000 | 1000 – 5000 |

Those skilled in the art will understand that $H_2$ pressures in the high ranges will normally be utilized for refractory feedstocks such as resids, heavy gas oils and the like, and that optimum denitrogenation temperatures are usually somewhat higher than optimum desulfurization temperatures. Also, for denitrogenation, nickel is the preferred Group VIII metal while for desulfurization, cobalt is preferred. The presence of a small amount of silica in the catalyst is especially beneficial for denitrogenation. Preferably the catalyst is presulfided with dilute $H_2S$-containing gases in conventional manner prior to contact with the feedstock.

EXAMPLE 1

Eighty grams of reagent grade $MoO_3$ was slurried in 200 ml of distilled water and heated to 90° C. Next, 50 gms of powdered $CoCO_3$ was added gradually with stirring over a period of 15 minutes to prevent excessive foaming from $CO_2$ evolution. The mixture was digested at 95°–100° C. for 150 minutes, during which time a purple precipitate of well crystallized $CoMoO_4$ formed (as determined by X-ray analysis of a dried sample). The mixture was then cooled to 30°–40° C. and diluted with water to a total volume of 500 ml.

To the resulting cobalt molybdate slurry was then added 1200 gms of gelatinous boehmite hydrogel (22.7 wt.% $Al_2O_3$; no X-ray detectable bayerite or gibbsite) and 750 ml of water, and the resulting mixture was blended for 2 minutes in a high speed mixer. The homogenized mixture was partially dried overnight at 180° F., and then at higher temperatures with intermittent stirring until an extrudable consistency was reached. The material was then extruded through a 0.076 diameter die, air dried, transferred to a 20 mesh screen tray and further dried at a rate of 45° C./hour to 650° C., and then calcined at 725° C. for one hour. The composition and properties of the calcined catalyst were as follows:

| | |
|---|---|
| $MoO_3$, wt.% | 11.6 |
| CoO, wt.% | 5.14 |
| $Al_2O_3$ | balance |
| Surface Area BET, $m^2/g$ | 274 |
| Pore Volume ml/g | 0.47 |
| Bulk Density, g/ml | 0.76 |
| Particle Diameter, ins. | 0.052 |

Neither the dried extrudate nor the calcined catalyst exhibited a cobalt molybdate X-ray pattern, and the intensity of the boehmite diffractograms were substantially decreased, showing that the $CoMoO_4$ had reacted with a portion of the boehmite.

In the standard resid desulfurization activity test described in my U.S. Pat. No. 3,980,552, this catalyst was found to have an activity at least equal to the preferred catalyst of Example 3 of said patent, which was prepared by a considerably more complicated and expensive procedure.

EXAMPLE 2

A silica-containing catalyst of this invention was prepared by first slurrying 60 gms of reagent grade $MoO_3$ in 200 ml of distilled water and heating to about 90°–95° C. Next, 33.8 gms of powdered $CoCO_3$ was added gradually with stirring. The mixture was digested for 60–80 minutes at 95°–100° C., forming a purple precipitate of $CoMoO_4$. To the resulting cooled slurry was then added, as a slurry in 800 ml of water, 1900 gms of a boehmite hydrogel filter cake containing 20 wt.% $Al_2O_3$ on a dry basis. The mixture was then homogenized for 3-5 minutes.

Silica was then added to the mixture in the form of 250 gms of a cobalt-exchanged silica-alumina hydrogel filter cake containing about 12 wt.% solids on an oven dried basis. A large batch of this filter cake had been prepared by ionexchanging 1000 gms of a 75/25 weight-ratio $SiO_2/Al_2O_3$ hydrogel containing 13 wt.% oven dried solids with an ammoniacal complex of 25 gms $CoCO_3$ dissolved in 1000 ml of 28% $NH_4OH$, followed by filtration and washing. On a dry basis, the filter cake contained 5.75 wt.% Co.

The 250 gm portion of Co-exchanged silica-alumina filter cake was then homogenized for 2–3 minutes with the boehmite-$CoMoO_4$ slurry and 500 ml of added water. The homogenized mixture was then partially dewatered by evaporation overnight in an oven at 180° F., and then at temperatures up to about 340° F., with intermittent mixing and stirring until an extrudable consistency was reached. This mixture was then extruded through a 0.076 inch diameter die, air dried, then further dried at temperatures increasing about 45° C./hr to 650° C., and then calcined at 700° C. for one hour. The composition and properties of the resulting catalyst were as follows:

| | |
|---|---|
| $MoO_3$, wt. % | 11.9 |
| CoO, wt. % | 4.44 |
| $SiO_2$, wt. % | 3.9 |
| $Al_2O_3$ | balance |
| Surface Area, $m^2/g$ | 331 |
| Pore volume, ml/g | 0.48 |

This product likewise did not exhibit a $CoMoO_4$ X-ray pattern.

EXAMPLE 3

The catalyst of Example 2 was compared in activity with the preferred catalyst of Example 3 of my U.S. Pat. No. 3,980,552, which was prepared by a more expensive impregnation, double-calcination procedure, and contained by weight, 4% CoO, 12% $MoO_3$, and 2% $SiO_2$. After presulfiding, the respective catalysts were tested for desulfurization and denitrogenation activity, using as the feedstock a light diesel oil containing 390 ppm total nitrogen and 6500 ppm of sulfur. For each catalyst two runs were carried out, one at 2.5 LHSV and the other at 5.0 LHSV, the other conditions being: 700° F., 700 psig of $H_2$, and 3000 SCF of $H_2/B$. The average relative activities of the catalysts, based on standard kinetic calculations, were found to be as follows:

| | Relative Activities | |
|---|---|---|
| Catalyst | USP 3,980,552 | Example 2 |
| Denitrogenation (total)[1] | 100 | 103 |
| Desulfurization[2] | 100 | 104 |

[1]Based on first order kinetics
[2]Based on 1.5 order kinetics

It will thus be seen that, despite its much more economical method of manufacture, the catalyst of Example 2 was at least equal in desulfurization and denitrogenation activities, as compared to the prior art catalyst.

I claim:

1. A process for the hydrofining of a mineral oil feedstock containing organic sulfur and/or nitrogen compounds, which comprises contacting said feedstock plus added hydrogen, and under hydrofining conditions, with a sulfided catalyst which, prior to sulfiding, contained about 2–20 weight-percent of CoO and/or NiO and about 5–35 weight-percent $MoO_3$, said catalyst having been prepared by the steps of:
   (1) reacting in an aqueous slurry at least one carbonate or hydroxide of cobalt or nickel with at least a stoichiometric proportion of $MoO_3$ and/or molybdic acid to form finely divided undissolved crystalline cobalt- and/or nickel molybdate in aqueous suspension;

(2) mixing said aqueous suspension with sufficient alumina hydrate consisting essentially of gelatinous boehmite to provide about 50–90 wt.% $Al_2O_3$ in the finished catalyst;
(3) digesting and/or mulling the resulting mixture for at least about 0.5 hour with at least sufficient water to provide an extrudable plastic mixture;
(4) recovering from step (3) an extrudable plastic mixture;
(5) extruding the plastic mixture to provide extrudates of desired size and shape; and
(6) drying and calcining the extrudates at a maximum temperature between about 800° and 1500° F.

2. A process as defined in claim 1 wherein said alumina hydrate is in the form of a freshly prepared hydrogel.

3. A process as defined in claim 1 wherein said alumina hydrate is in the form of a xerogel containing at least about 20 wt.% $H_2O$.

4. A process as defined in claim 1 wherein step (1) is carried out at about 70°–100° C. with agitation.

5. A process as defined in claim 1 wherein step (3) is carried out at about 50°–100° C.

6. A process for the hydrofining of a mineral oil feedstock containing organic sulfur and/or nitrogen compounds, which comprises contacting said feedstock plus added hydrogen, and under hydrofining conditions, with a sulfided catalyst which, prior to sulfiding, contained about 2–20 weight-percent of CoO and about 5–35 weight-percent $MoO_3$, said catalyst having been prepared by the steps of:

(1) reacting in an aqueous slurry, powdered cobalt carbonate and/or cobalt hydroxide with at least a stoichiometric proportion of $MoO_3$ and/or molybdic acid to form finely divided undissolved crystalline cobalt molybdate in aqueous suspension;
(2) mixing said aqueous suspension with sufficient alumina hydrate consisting essentially of gelatinous boehmite to provide about 50–90 wt.% $Al_2O_3$ in the finished catalyst;
(3) digesting and/or mulling the resulting mixture for at least about 0.5 hour with at least sufficient water to provide an extrudable plastic mixture;
(4) recovering from step (3) an extrudable plastic mixture;
(5) extruding the plastic mixture to provide extrudates of desired size and shape; and
(6) drying and calcining the extrudates at a maximum temperature between about 800° and 1500° F.

7. A process as defined in claim 6 wherein said alumina hydrate is in the form of a freshly prepared hydrogel.

8. A process as defined in claim 6 wherein said alumina hydrate is in the form of a xerogel containing at least about 20 wt.% $H_2O$.

9. A process as defined in claim 6 wherein step (1) is carried out at about 70°–100° C. with agitation.

10. A process as defined in claim 6 wherein step (3) is carried out at about 50°–100° C.

* * * * *